United States Patent [19]
von Hippel et al.

[11] Patent Number: 6,048,512
[45] Date of Patent: *Apr. 11, 2000

[54] PROCESS FOR PREPARING CATALYTICALLY ACTIVE COATINGS FOR THE SYNTHESIS OF HYDROGEN CYANIDE

[75] Inventors: Lukas von Hippel, Alzenau; Christian Bussek, Kahl; Jörg Sauer; Manfred Sauer, both of Rodenbach; Dietrich Arntz, Oberursel, all of Germany

[73] Assignee: Degussa Aktiengesellschaft, Frankfurt, Germany

[ * ] Notice: This patent is subject to a terminal disclaimer.

[21] Appl. No.: 09/280,842

[22] Filed: Mar. 30, 1999

Related U.S. Application Data

[62] Division of application No. 08/845,447, Apr. 25, 1997, Pat. No. 5,928,984.

[30] Foreign Application Priority Data

Apr. 27, 1996 [DE] Germany .................... 196 17 040

[51] Int. Cl.$^7$ ................... B01J 27/24; C01C 3/02
[52] U.S. Cl. ............................. 423/376; 502/200
[58] Field of Search ................ 423/412, 376; 502/200; 427/376.3, 376.6

[56] References Cited

U.S. PATENT DOCUMENTS

| | | | |
|---|---|---|---|
| 3,112,215 | 11/1963 | Ruosch et al. . | |
| 5,039,643 | 8/1991 | Hecht et al. | 423/376 |
| 5,234,676 | 8/1993 | Howard | 423/412 |
| 5,346,720 | 9/1994 | Lombard et al. | 427/376.3 |
| 5,928,984 | 7/1999 | Von Hippel et al. | 502/200 |

FOREIGN PATENT DOCUMENTS

| | | |
|---|---|---|
| 0 088 988 A1 | 9/1983 | European Pat. Off. . |
| 0 299 175 A1 | 1/1989 | European Pat. Off. . |
| 0 407 809 A1 | 1/1991 | European Pat. Off. . |
| 875393 | 8/1961 | United Kingdom . |

*Primary Examiner*—Wayne Langel
*Attorney, Agent, or Firm*—Smith, Gambrell & Russell, LLP

[57] ABSTRACT

A process for preparing catalytically active coatings for the synthesis of hydrogen cyanide on moulded items substantially consisting of aluminum oxide. The catalytically active coatings contain, as active components, at least one platinum group metal and a nitride waich are applied to the moulded item by means of a coating dispersion which contains the active components as finely divided solids. This means that the hitherto conventional production of aluminum nitride during the forming process is not required. The coatings therefore achieve their final activity level, which is well above that of conventional coatings, very rapidly. In addition, these catalysts can be started up under high load and have a lower operating temperature.

3 Claims, No Drawings

PROCESS FOR PREPARING CATALYTICALLY ACTIVE COATINGS FOR THE SYNTHESIS OF HYDROGEN CYANIDE

The application is a divisional application of U.S. application Ser. No. 08/845,447, filed Apr. 25 1997, U.S. Pat. No. 5,928,984, which is relied on and incorporated herein in its entirety.

INTRODUCTION AND BACKGROUND

The present invention relates to catalytically active coatings on the surfaces of moulded shaped bodies for the synthesis of hydrogen cyanide from hydrocarbons and ammonia, wherein the catalytically active layer contains nitrides and at least one platinum metal. More particularly, the present invention relates to the process of raking these catalysts. In another aspect, the present invention relates to the use of the catalyst produced as described above for the synthesis of hydrogen cyanide from hydrocarbons and ammonia.

According to the so-called BMA process developed by Degussa A. G., lower hydrocarbons, in particular methane, are reacted with ammonia at temperatures of about 1000 to 1350° C. in the presence of a catalyst to give hydrogen cyanide (HCN) and hydrogen (see Ullmann's Encyclopedia of Industrial Chemistry, 5th edition 1987, vol. A 8, pages 162–163 incorporated herein by reference). The strongly endothermic reaction generally takes place in tubular reactors. The internal surface of the reaction tubes, substantially made from aluminum oxide, which are suspended in a BMA tubular reactor and are externally heated, is provided with a catalytically active coating.

According to the process in DE-A 10 13 636, the reaction gases are passed over catalysts which, in addition to one or more platinum group metals, in particular platinum, also contain aluminum or elements from the lanthanide series, individually or several together, substantially in the form of their nitrides. A preferred catalytically active coating on moulded bodies made of aluminum oxide contains platinum and aluminum nitride.

To prepare this type of coating, the moulded bodies are impregnated with, for example, aluminum-containing solutions of hexachloroplatinic acid. After drying, the catalytically active components are reduced with hydrogen at 600 to 900° C. The nitride is formed in the BMA reactor during the start-up phase, under the effect of the ammonia used for HCN synthesis. The start-up phase, only after which does the catalyst achieve its full potential, lasts about 25 hours.

A substantially improved process for preparing the catalytically active coating is described in DE 39 23 034 C2. According to this patent, the surfaces of the moulded bodies are wetted with a dispersion which contains, as coating components, particulate elemental platinum groups metal and particulate elemental aluminum metal with the particle sizes of each being substantially less than 100 μm. The surfaces of the moulded bodies treated in this way are slowly heated up to the reaction temperature of the BMA process, 1000 to 1350° C., in the presence of nitrogen and/or ammonia in order to convert the coating into the catalytically active state thereby forming the catalyst needed for the chemical reaction producing the hydrogen cyanide. If ammonia is used during the heating procedure, then the catalyst has been effectively formed on achieving the reaction temperature.

An object of the present invention is to provide a process for preparing catalytically active coatings on the surface of moulded bodies substantially made from aluminum oxide, for the synthesis of hydrogen cyanide, which provide catalytically active coatings having a higher catalytic activity than conventional coatings and capable of being loaded in a very short time with the high reactant flow-rates present during steady-state operation.

SUMMARY OF THE INVENTION

The above and other objects of the invention are achieved by a process for preparing catalytically active coatings on the surface of shaped ceramic moulded bodies used for the synthesis of hydrogen cyanide from hydrocarbons and ammonia by uniformly wetting the moulded bodies with a coating dispersion containing at least one particulate elemental platinum group metal and a further coating component in a carrier liquid, evaporating the carrier liquid and converting the coating into the catalytically active state by slowly heating to 1000 to 1350° C. in the presence of nitrogen and/or ammonia.

A feature of the invention is using particulate nitrides of the elements aluminum, boron, titanium and silicon as cations, individually or as a mixture, as the further coating components, wherein the particulate components have average particle sizes of substantially less than 100 μm.

The particulate metals and particulate nitrides contained in the dispersion have particle sizes; of less than 100 μm, preferably less than 50 μm. Coating dispersions with the smallest possible particle sizes are preferred because the particles in this type of dispersion are less likely to settle out.

DETAILED DESCRIPTION OF INVENTION

In carrying out the present invention the coating dispersion contains a member selected from the platinum group metals, that is, rhodium, ruthenium, palladium, osmium, iridium and platinum as well as mixtures thereof. Platinum is preferred. The platinum metals are obtainable in finely divided elemental form in a simple manner by, for example, reducing solutions of their compounds, wherein so-called blacks of the platinum metals are particularly preferably used in the process according to the invention. Platinum blacks are commercially available.

The particulate nitrides that are used in the present invention to include in the coating are generally prepared from the relevant element and ammonia and/or nitrogen (e.g. G. Selvaduray and L. Sheet, Mater. Sci. Technol., 9 (1993), 463–473). The nitrides of Al, B, Ti and Si can be formed in this way. Other elements, such as e.g. lithium, which catalyze the reaction may also be added. The powders obtainable in this way are commercially available in a variety of qualities and purities from different manufacturers.

Nitrides of aluminum, boron, titanium and silicon may be used separately or as a mixture for the catalytic coating. Aluminum nitride is preferably used.

Solvents which are suitable as (carrier liquids for preparing the coating dispersion are for example, inert organic solvents such as aliphatic and aromatic hydrocarbons, esters, ketones or alcohols and mixtures of these types of solvent. Solvents or mixtures with a boiling point or boiling range below 350° C., in particular below 150° C., are extremely suitable. Lower alcohols and aromatic: and non-aromatic hydrocarbons are particularly preferred carrier liquids.

The solids concentration of the dispersion may vary between wide limits, provided the dispersion has the desired processing viscosity. In general, the dispersions contain 10 to 300 wt.% of metal powder and nitride powder, preferably 30 to 200 and in particular 50 to 150 wt.%, with reference to the carrier liquid.

By adjusting the concentration of metal powder and nitride powder in the dispersion it is possible to apply the amount of platinum metal and nitride required to produce a long operating, lifetime for the coated moulded body in a single coating step. A concentration of less than 10 mg of platinum metal per $cm^2$ of catalytically active surface is perfectly adequate. A surface concentration of 0.05 to 5 mg of $Pt/cm^2$ is preferred, in particular of 0.1 to 2 $mg/cm^2$.

In the dispersion, the atomic ratio of platinum metals to cations of nitrides is 0.001 to 1:1. A ratio adjusted to be in the range 0.01 to 0.5:1 is preferred. A Pt to cations ratio in the range 0.01 to 0.2 is particularly appropriate.

After evaporating the carrier liquid from the dispersions, the coated moulded bodies are slowly heated to 1000 to 1350° C. in the presence of nitrogen and/or ammonia. The heating period depends strongly on the furnace used and the properties of the moulded bodies. The BMA reaction temperature is generally reached within 2 to 20 hours, mostly 5 to 15 hours. After a further treatment time of 2 to 10 hours at the reaction temperature, forming of the catalyst is complete.

In conventional production processes aluminum nitride, inter alia, is produced during forming in the temperature range between 600 and 1000° C. In contrast, the formation of nitrides during the forming procedure in the process according to the invention does not need to take place, due to the use of nitrides in the coating dispersion.

The synthesis of hydrogen cyanide can start immediately after the forming process, without interrupting the ammonia supply, by adding methane. Optionally, the ammonia stream is first adjusted to the value required for steady-state operation. The methane supply is continuously increased until a molar ratio of methane flow to ammonia a flow of 0.8 to 0.99 is achieved. The methane to ammonia molar ratio is selected to be less than stoichiometric in order to discourage the formation of carbon black soot which would deactivate the catalyst. The rate of increase of the methane supply up to the steady-state value is therefore accurately controlled so that no soot formation occurs.

In the case of conventionally prepared catalyst coatings, this start-up phase can take several days, especially with high reactant flows. In the case of the catalyst coating prepared according to the invention, however, the steady state can be achieved after only a few hours, without soot formation being observed.

The coating dispersion can contain, in addition to the components essential to the invention, soluble and/or insoluble auxiliary agents in the carrier liquid in order, for example, to delay sedimentation and/or to adjust the viscosity and to improve adhesion of the coating to the moulded items before and/or after forming the catalyst.

These auxiliary agents may be polymeric organic lacquer binders which are degraded during the catalyst forming procedure without leaving a residue such as, for example, polyacrylates, polyester resins, polyurethanes. Conventional auxiliary agents used in the production of lacquers such as organic and/or inorganic flow control agents, sedimentation retarders and thixotropic agents, such as for example pyrogenic silica or silanes, may also be used here in effective amounts.

Furthermore, the coating dispersion may contain the adhesive oxides or precursors for the same which are described in DE 39 23 034 C2. These are metal compounds in the form of oxides and/or silicates and/or borates which are capable of forming a glass at below 1000° C. and glaze frits with a hemisphere temperature below 1000° C. These substances can be beneficial to the efficacy and operating lifetime of the catalytically active coating. They are preferably used in an amount which is less than that of the nitride, preferably in an amount of 5 to 50 wt.%, with reference to the nitride. A suitable adhesive oxide is, for example, magnesium oxide.

Another precursor of an adhesive oxide which may be used is an organic silicon compound from the group of orthosilicates, organosilanes with one to three hydrolyzable groups on silicon atoms, in particular trialkoxysilanes, or condensation products of the monomeric silicon compounds mentioned, in particular poly(diorganosiloxanes) and poly (organoalkoxy-siloxanes).

The process may be used to coat a variety of shaped moulded bodies such as spheres, pellets, sponge-like structures, monoliths or tubes. Reaction tubes and monolithic honeycomb structures with parallel flow channels are particularly preferably used, however, in the BMA process. With these moulded items, the catalytically active coating is located on the internal walls of the tubes or flow channels. The moulded items must be gas-tight, that is they must possess no open porous structures, and may consist of any known ceramic materials. Moulded items which consist substantially of α-aluminum oxide and may also contain, apart from aluminum oxide, small amounts of other oxides as a result of the production process, are preferred.

The actual coating procedure is performed in a manner known per se, manually or using suitable coating devices, by impregnating or wetting the surface to be coated with the dispersion and evaporating the carrier liquid. The coating apparatus described in U.S. Pat. No. 4,415,485, for example, is suitable for the present process. After removing the excess dispersion, the solvent is removed by evaporation, for example by heating the moulded items, by flushing out with a gas and/or by reducing the pressure. Previously heated moulded items may also be placed in contact with the dispersion.

After completion of the coating procedure, the moulded items are slowly, that is to say over the course of several hours, heated to the temperature conventionally used for the BMA process in the BMA reactor in thee presence of nitrogen, or preferably ammonia, or mixtures of these gases.

The invention is explained in more detail by means of the examples. The internal walls of tube made of α-aluminum oxide were coated with catalytic coatings in accordance with the process according to the invention and in accordance with conventional processes. Coating was performed manually by immersing the tubes in the coating dispersion.

The tubes had an internal diameter of 16 mm. For laboratory tests, tubes with lengths of 0.5 m were used, these being heated to a maximum temperature of 1210° C. in an electrical tubular furnace to form the catalyst and to synthesize hydrogen cyanide. In parallel with this, production tubes of 2.1 m length were coated and formed in a production reactor heated with hot gases and the catalytic activity was then investigated.

The catalyst coatings in the laboratory and production tubes were each formed in 20 hours. For this purpose, the tubes were heated from room temperature to the maximum temperature over the course of 12 hours and then held at this temperature for a further 8 hours.

COMPARISON EXAMPLE 1

A conventional coating dispersion consisting of aluminum and platinum powder with an atomic ratio Al:Pt of 10:1 was prepared in the same way as described in DE 39 23 034 C2.

For this, 105 g of a 40% strength Degalan® solution and 2.7 g of Aerosil® (flame hydrolytically prepared silica), 60 g of phenyl-ethyl-polysiloxane (PEPS), were dispersed in 240 ml of toluene. 166 g of aluminum powder (average particle size<60 µm) were added to this dispersion and dispersed. The required amount of 120 g of platinum powder (average particle size<60 µm, purity>98.5%) was dispersed in a further 160 ml of toluene and added in portions to the aluminum-containing dispersion. Dispersion was then continued for another 5 minutes. The dispersion obtained in this way can be stored for several weeks without any danger of separating. Degalan® and Aerosil® are trademarks of Degussa A.G.

This dispersion was used to coat the internal walls of a 0.5 m long tube by immersion. 3.5 g of dispersion (dry fraction) could be deposited on the internal wall of the tube by means of a single coating procedure. To form the catalyst, the tube was heated from room temperature to 1210° C. over 12 hours in an electrically heated tubular furnace and held at this temperature for a further 8 hours. A stream of ammonia flowed through the tube at a rate of 3 mol/h for the entire period.

After completion of forming, the synthesis of hydrogen cyanide was started. For this purposes, methane was added at a slowly increasing rate of mass-flow in order to prevent the formation of soot and thus deactivation of the catalyst. Only after four days did the methane flow correspond to the steady-state value of 2.7 mol/h, corresponding to a molar ratio of methane to ammonia of 0.9.

Under steady-state operation, the yield of hydrogen cyanide, with reference to methane, was 78%, so 56.9 g per hour of hydrogen cyanide could be prepared using the tube.

EXAMPLE 1

A coating dispersion was prepared from aluminum nitride powder and platinum powder with an atomic ratio of aluminum to platinum of 10:1. The preparation procedure was the same as that described in comparison example 1. Instead of 166 g of aluminum powder, however, 252 g of aluminum nitride powder (average particle size<60 µm; purity>98%) were used.

This coating dispersion was used to coat a 0.5 m long tube consisting of a-aluminum oxide with a catalyst, to form the catalyst and to check its catalytic activity. The amount of coating material was 3.2 g of dry substance.

Forming and testing were performed in precisely the same way as in comparison example 1. The addition of methane, however, was completed after 6 hours, without any soot formation being observed.

Under steady-state operation (3 mol/h of ammonia; 2.7 mol/h of methane, 1210° C.), the yield of hydrogen cyanide, with reference to methane, was 82%, so 59.8 g per hour of hydrogen cyanide could be produced with the tube.

EXAMPLE 2

Example 1 was repeated. However, the aluminum nitride powder was replaced by 154 g of boron nitride (atomic ratio boron to platinum: 10:1) and the amount of toluene used was increased to a total of 620 ml. The boron nitride had an average particle size of <10 µm and a purity of >95%. The amount of coating material on the internal wall of the tube was 3.7 g of dry substance.

After forming, the addition of methane could be completed within 4 hours. Under steady-state operation (3 mol/h of ammonia; 2.7 mol/h of methane, 1210° C., the yield of hydrogen cyanide, with reference to methane, was 67%, so 48.8 g per hour of hydrogen cyanide could be produced with the tube.

EXAMPLE 3

Example 1 was repeated. However, the aluminum nitride powder was replaced by 382 g of titanium nitride (atomic ratio titanium to platinum: 10:1) and the amount of toluene used was, increased to 590 ml. The titanium nitride had an average particle size of <10 µm and a purity of >95%. The amount of coating material was 3.4 g of dry substance.

After forming, the addition of methane could be completed within 5 hours. Under steady-state operation (3 mol/h of ammonia; 2.7 mol/h of methane; 1210° C.), the yield of hydrogen cyanide was 52%, with reference to methane, so 37.1 g per hour of hydrogen cyanide could be produced with the tube.

EXAMPLE 4

Example 1 was repeated. However, the aluminum nitride powder was replaced by 282 g of silicon nitride (atomic ratio silicon to platinum: 10:1) and the amount of toluene used was increased to 590 ml. The silicon nitride had an average particle size of <25 µm and a purity of >90%. The amount of coating material was 2.9 g of dry substance.

After forming, the addition of methane could be completed within 7 hours. Under steady-state operation (3 mol/h of ammonia; 2.7 mol/h of methane; 1210° C.), the yield of hydrogen cyanide was 75%, with reference to methane, so 54.7 g per hour of hydrogen cyanide could be produces with the tube.

COMPARISON EXAMPLE 2

A 2.1 m long ceramic tube was coated with the conventional coating dispersion from comparison example 1. After evaporating the carrier liquid, the catalyst was formed in a furnace heated by hot gases. Here, 32 mol/h of ammonia flowed through the tube and the temperature was raised from room temperature to 1320° C. over the course of 12 hours and held at this level for a further 8 hours. The methane supply was then introduced at a rate of up to 29.5 mol/h of methane molar ratio of methane to ammonia: 0.92). In order to avoid soot formation, the final methane loading of the tube could be achieved only after 9 days.

Under steady-state operation (32 mol/h of ammonia; 29.5 mol/h of methane, 1320° C.), the yield of hydrogen cyanide, with reference to methane, was 78%, so 725.8 g per hour of hydrogen cyanide could be produced with the tube.

EXAMPLE 5

A 2.1 m length ceramic tube was coated with the coating dispersion from example 1 and formed as described in comparison example 2. The supply of methane at a rate of up to 29.5 mol/h of methane could be completed after 7 hours, without soot formation taking place.

The yield of hydrogen cyanide, with reference to methane, under steady-state operation (32 mol/h of ammonia; 29.5 mol/h of methane, 1320° C.) was 86%, so 743.0 g per hour of hydrogen cyanide could be produced with the tube.

EXAMPLE 6

Example 5 was repeated. Differently from example 5, however, forming was performed at a maximum temperature of only 1270° C. The methane supply could be completed after 6 hours.

Under steady-state operation (32 mol/h of ammonia; 29.5 mol/h of methane, 1270° C.), the yield of hydrogen cyanide was 89%, so 769 g per hour of hydrogen cyanide could be produced with the tube. This is 6% more than in comparison example 2, although the reaction temperature is 50° C. below the reaction temperature in comparison example 2.

The preceding examples show that catalysts prepared according to the invention, after forming under high load, could be loaded with the methane stream for steady-state operation much more rapidly than conventionally prepared catalysts. In the case of the 2.1 m long production tube, the supply of methane to catalysts prepared according to the invention could be completed in less than one thirtieth of the time required for conventionally prepared catalysts. In addition, higher yields are obtained at lower reaction temperatures.

Conventionally prepared catalysts frequently exhibit reduced catalytic activity after interruptions in production caused by furnace problems. This could not be observed with catalysts prepared according to the invention. After interruptions in production, they very rapidly achieved their original level of activity again.

Further variations and modifications of the foregoing will be apparent to those skilled in the art and are intended to be encompassed by the claims appealed hereto.

German priority application 196 17 040.0 is relied on and incorporated herein by reference.

What is claimed is:

1. A process for synthesis of hydrogen cyanide according to the BMA process wherein a shaped ceramic molded body is produced by a process comprising uniformly wetting a ceramic molded body with a coating dispersion which contains at least one particulate elemental platinum group metal and a particulate nitride of an element selected from the group consisting of aluminum, boron, titanium, silicon and mixtures thereof as cation in a vaporizable carrier liquid, evaporating the carrier liquid and converting the coating into the catalytically active state by slowly heating to 1000 to 1350° C. in the presence of nitrogen and/or ammonia, wherein said particulate nitride and said platinum group metal have an average particle size of less than 100 $\mu$m, and said shaped ceramic body is used as a catalyst to synthesize hydrogen cyanide from hydrocarbons and ammonia according to the BMA process.

2. A shaped ceramic molded body having a catalytically active coating on a surface thereof, said shaped ceramic molded body is prepared by a process comprising uniformly wetting a ceramic molded body with a coating dispersion which contains at least one particulate elemental platinum group metal and a particulate nitride of an element selected from the group consisting of aluminum, boron, titanium, silicon and mixtures thereof as a cation in a vaporizable carrier liquid, evaporating the carrier liquid, and converting the coating into the catalytically active state by slowly heating to 1000 to 1350° C. in the presence of nitrogen and/or ammonia, wherein said particulate nitride and said particulate platinum group metal have an average particle size of less than 100 $\mu$m.

3. The shaped ceramic molded body defined in claim 2, wherein said body is in the shape of a tube.

* * * * *